United States Patent
Burton et al.

Patent Number: 5,569,542
Date of Patent: Oct. 29, 1996

[54] COMPOSITE BOARD

[75] Inventors: Peter J. Burton; Brent P. Deale, both of Victoria, Australia

[73] Assignee: ACI Australia Limited, Australia

[21] Appl. No.: 373,587

[22] Filed: Jan. 17, 1995

[51] Int. Cl.⁶ .................................... B32B 27/42
[52] U.S. Cl. .................. 428/529; 428/526; 428/236; 428/301
[58] Field of Search ........................ 428/526, 301, 428/236, 529

[56] References Cited

U.S. PATENT DOCUMENTS

| | | | |
|---|---|---|---|
| 4,130,458 | 12/1978 | Moore et al. | 162/159 |
| 4,175,148 | 11/1979 | Luck et al. | 428/171 |
| 4,269,949 | 5/1981 | Hickson et al. | 525/58 |
| 4,376,088 | 3/1983 | Prather | 264/109 |
| 4,480,061 | 10/1984 | Coughlin et al. | 524/13 |
| 4,642,268 | 2/1987 | St. Michel | 428/453 |
| 4,725,382 | 2/1988 | Lewchalermwong | 252/607 |
| 4,935,457 | 6/1990 | Metzner et al. | 524/14 |

FOREIGN PATENT DOCUMENTS

| | | |
|---|---|---|
| 86-112937 | 4/1986 | Belgium . |
| 52-100554 | 8/1977 | Japan . |
| 53-66005A | 8/1978 | Japan . |
| 63-256404 | 10/1988 | Japan . |
| 5-43879 | 2/1993 | Japan . |
| 84-242685 | 2/1984 | U.S.S.R. . |
| 89-059718 | 8/1988 | U.S.S.R. . |
| 818574 | 8/1959 | United Kingdom . |
| 1261136 | 1/1972 | United Kingdom . |
| 1435519 | 2/1978 | United Kingdom . |
| 1552127 | 9/1979 | United Kingdom . |
| 2152063 | 7/1985 | United Kingdom . |
| 2165270 | 4/1986 | United Kingdom . |

*Primary Examiner*—P. C. Sluby
*Attorney, Agent, or Firm*—Wolf, Greenfield & Sacks, P.C.

[57] ABSTRACT

A composite board which includes a core and inner and outer surface layers, said core and surface layers each including cellulose material and a cured resin binding said cellulose material together, wherein the resin in the core of the composite is an acid setting resin and the core includes a low steam volatile weak acid in an amount of between 2 to 8% by weight to the dry weight of the cellulose material in the core.

38 Claims, 2 Drawing Sheets

COMPOSITE BOARD

BACKGROUND OF THE INVENTION

This invention relates to an improved composite board of the type made from cellulose material and a synthetic resin.

A composite board comprises cellulose material such as timber chips, fibres or particles bound together with an adhesive binder. Generally, composite boards are formed by first forming a mixture of the cellulose material and the resin and thereafter consolidating the mixture under pressure, usually in a press or mould, and during the course of compression, or subsequently, curing the resin by the application of heat.

Examples of composite boards include fibre boards where the cellulose material comprises wood fibres, chip boards where wooden chips are utilized and particle boards where the cellulose material is constituted by wood flakes and particles. In each of these board types, the cellulose material may be of varying sizes throughout the board. The present invention is applicable in the formation of any such board but is particularly suitable for the manufacture of particle boards and fibre boards.

The physical strength, resistance to moisture uptake and other physical characteristics of any particular board can be modified by utilizing different resin systems, utilizing more or less resin, modifying the density of the board and/or by utilizing other additives amongst other factors known in the art of board making.

The density of any particular board can be readily modified by changing processing conditions. These conditions include the amount and type of resin and cellulose fibre used, and the pressure under which the composite mixture is compressed whilst the resin is being cured. Standard particle boards currently manufactured range in density from between about 640 to 780 kg/m$^3$.

Many composite boards are manufactured using binders or resins which are heat setting. The strength and other physical characteristics of any particular board are influenced by the extent to which the resin is cured during the manufacturing process. The primary means for curing the resin in such boards is by the application of heat whilst the board is being compressed. Standard board presses utilize wide heated platens which transfer heat to the board during compression. Whilst this heat is effective in curing the resin towards the surface of the board, it is less effective in curing the core or centre of the board. The evolution of steam is the main heat transfer medium to the core, and this temperature does not exceed much above 105° C. even when the platen temperature is significantly higher.

Because of this problem, it has previously been proposed to utilize heat setting resins which also cure (even in the absence of heat) in acid conditions. Boards utilizing such resins have previously been made in conjunction with a small amount of a compound which will produce an acid during the formation process. For example, ammonium chloride has previously been used within the core of such composites. The ammonium chloride is believed to react with the free formaldehyde that is present in the resin to form hydrochloric acid and the hydrochloric acid itself drives the reaction which cures the resin. This enables one to manufacture a board where the resin in the core is to a large extent cured, notwithstanding the difficulty in heating the core to temperatures high enough to effect heat setting of the resin in this region.

Whilst the use of materials like ammonium chloride improve the core strength of the board produced, the applicants have found that in such boards the core is still weaker than the surface where the resin has been more effectively heat cured.

SUMMARY OF THE INVENTION

It is an object of the present invention to provide a composite board where the core of the board has improved physical strength, moisture resistance, durability and lower formaldehyde emissions.

The applicants have discovered that if the core of board is made so to comprise a relatively low level of a low steam volatile, weak acid then improvement in overall board performance can be achieved.

Thus, according to the present invention, there is provided a composite board which includes a core and inner and outer surface layers said core and surface layers each including cellulose material and a cured resin binding said cellulose material together, wherein the resin in the core of the composite is an acid setting resin and the core includes a low steam volatile weak acid in an amount of between 2 to 8% by weight to the dry weight of the cellulose material in the core.

All percentages of weak acid within the composite board expressed throughout this specification are on a weight basis to the dry weight of the cellulose material.

The core and inner and outer surface layers may form a homogenous board in which the layers and the core are integrated uniformly and have substantially the same composition throughout. In such case, the weak acid would be present in an amount of between 2 to 8% by weight to the dry weight of the cellulose material of the entire board and an acid setting resin used throughout. Alternatively, the inner and/or outer surface layers may differ in weak acid content to that of the core. Preferably, the core of the board is the centrally located portion of the board and comprises between 50 to 70% of the weight of the board.

The weak acid should be of such nature that it will not be emitted or lost from the board (or only emitted or lost in relatively small amounts) during the manufacturing process. As steam is generated in this process, the weak acid must have a low steam volability. Preferably, the weak acid used has a steam volatility such that at 1.0 atmospheres steam pressure the acid concentration in steam from a solution containing 10 grams of acid per kilogram of water would be less than 40.0 mg of acid per kilogram of steam. Most preferably, the steam volatility of the acid is much that less than 20.0 mg of acid would be present per kilogram of steam under these conditions.

One group of suitable weak acids are low water soluble acids. The solubility of such acids is preferably in the range 0.5 to 6.0 g/100 g H$_2$O at 20° C. and they preferably have a pKa value in the range 7.0 to 12.0. The most suitable weak acids for use in the invention are inorganic acids such as boric acid, silicic acid or antimonic acid. Alternatively, in some circumstances one may utilize aqueous solutions of the acid salt. This, however, is less preferred.

It has been found by the applicants that composite boards having compositions falling within the parameters indicated above have improved physical characteristics over conventional boards. Whilst not wishing to be bound by any particular theory, it is believed that the addition of the low steam volatile weak acid enables the resin within the core of the board to more fully cure, particularly after the board has been removed from the press. Acid curing of the core within conventional processes is thought by the applicant to substantially stop once the board is removed from the press with a large proportion of the steam volatile acid disappearing with the steam which is emitted when the board is taken out of the press.

Low water soluble weak acids such as boric acid silicic acid and antimonic acid have previously been used in composite boards as fire retardants. However, to be effective as fire retardants, such weak acids have been used in amounts of at least about 12 to 15%. It has been previously found that when materials such as these have been used as fire retardants, they have had a deleterious effect on the physical strength of the composite board. Internal bond strength and the water resistance of the resulting board have been markedly reduced. It has been thought that the low water soluble weak acid was interfering with the physical contact between the resin and the cellulose material.

It has now surprisingly been found that within a narrow range of addition of such weak acids, that these physical characteristics are actually enhanced over the properties of a board simply utilizing a resin alone. The weak acid should be present in at least the core of the board and in the core in an amount of no less than 2% to the dry weight of the cellulose material in the core. The unexpected enhancement of the physical properties of the board has been found to optimally occur in particle boards at a level of between 4 to 6%. Above 6%, the influence of the added weak acid is less marked and if it is present in an amount of more than 8%, it has been found that physical characteristics such as percentage boil swell start to decrease below that of a board made of resin alone. Thus, especially in the range of between 4 to 6% weak acid content, the applicants have found quite surprisingly that the addition of a low steam volatile weak acid, instead of reducing the board strength, actually improves the board strength and other physical characteristics.

The board of the present invention can utilize conventional acid curing resin systems. Preferably the same resin is used in each of the layers and the core of the board. Resins such as urea formaldehyde, melamine formaldehyde, melamine/urea/formaldehyde and melamine urea phenol formaldehyde can all be used. The resin should be present in a range of between 4 to 25% (this percentage is based on dry resin weight to the dry weight of the cellulose material). Preferably, the resin content is between 7 to 12% and most preferably in the range of between 8 to 10%.

It is desirable that the weak acid be distributed substantially uniformly through the cellulose/resin mix. This may be achieved by the addition of the weak acid in a powdered form to cellulose material prior to the incorporation of the resin. The weak acid is preferably added directly to the surface of the cellulose material in the required proportion. It is preferred to use technical grade granular boric acid. The particle size of the granules have not been found to be of particular importance. Generally, a particle size of between 80–500 microns is used.

The cellulose material can be in the form of wood chips, flakes, fibres or particles. For good adhesion of the weak acid to this material prior to the application of the synthetic resin, it is preferred that the cellulose material have a fairly low moisture content. After the cellulose material has been blended with the resin and weak acid, the moisture content of the cellulose material is preferably between about 7 to 9% (this percentage is based on the weight of moisture to the dry weight of all other components in the blend).

The invention has particular application in the production of particle boards and medium density fibre board. In particle boards, the conventional manner of manufacture lends itself to the production of boards having a different weak acid content in the core as opposed to the surface layers. Thus in particle board manufacture the invention can be practised simply by incorporating a suitable amount of an appropriate weak acid in the core. The surface layers can be produced having conventional composition without the addition of any weak acid or alternatively in special circumstances (such as is detailed below with regard to fire retardant boards) a higher proportion of a weak acid fire retardant may be included within the surface layers. When it comes to the manufacture of fibre board, conventional processes do not permit for the alteration of the amount of weak acid throughout the board. Thus the percentage content of the weak acid in the core will generally be the same in the surface layers. Generally speaking, for fibre boards it is preferred that the content of the weak acid be slightly higher than within the core of a particle board. In fibre boards, the most preferred range of weak acid addition is between 6 to 8% and this addition is throughout the entire thickness of the board.

Whilst the present invention has application to the manufacture of standard particle and fibre boards and improving the strength of such products, it also has particular application in the manufacture of fire retardant composite boards. Composite boards which simply comprise cellulose material and resin are highly flammable. As a result, various efforts have previously been made to incorporate a fire retardant within such composite boards so to improve their safety when used in building.

It has previously been proposed to add fire retardants such as ammonium salts, brominated compounds, sodium meteborate, zinc chloride, phosphoric acid and boric acid, amongst other materials to the composite board with a view to reduce both flammability and smoke emission. Traditional water soluble fire retardants have not generally been found suitable for composite board manufacture in Australia as the chemicals increase the smoke generated on combustion and the pH can interfere with the resin cure.

As indicated previously, some fire retardants are themselves weak acids, such as silicic acid and boric acid. It has been found by the applicants that if these weak acids are utilized in low levels, then the resulting board is of higher physical strength and slightly improved fire retardancy. However, levels between 2 to 8% of fire retardant are not suitable for use in a surface which could potentially be exposed to a flame. It has been found that fire retardant content in a surface layer should be above 8% and preferably somewhere between 10 to 15%.

It has, however, also been found that the same level of fire retardant is not required within the core. It has previously been considered desirable to uniformly distribute fire retardant through the entire composite to achieve the best fire retardancy and various methods have previously been proposed to achieve this. For example, see United Kingdom patent 1,261,136. However, the applicants have found that uniform distribution of the fire retardant is not required or desirable.

Thus, in accordance with a further aspect of this invention, there is provided a composite board which includes at least two layers, both including cellulose material and a cured resin binding said cellulose material together, wherein the first layer forms at least the core of the composite and the second layer is positioned on one side of said first layer so to form a surface layer of the composite; the resin in the first layer being an acid setting resin and said first layer further including a fire retardant in an amount of between 2 to 8% by weight to the dry weight of the cellulose material in said first layer, and said second layer including a fire retardant in an amount of between more than 8% to 15% by weight to the dry weight of the cellulose material in said second layer and wherein the fire retardant in the first layer is a low steam volatile weak acid.

The weak acid has the preferred characteristics of steam volatility, solubility and pKa as detailed previously. It is convenient to use the same fire retardant in both the core of the board and the surface layer or layers although this is not necessary. It is also preferred that the second layer be contiguous with one side of said first layer.

In one embodiment of this aspect of the invention where there is simply provided two layers. The first (or core) layer preferably amounts to more than 50% of the weight of the composite board. Most preferably, it amounts to between 60 to 80% of the weight of the board. It is intended that such a board in use would be positioned such that the second or surface layer would be that exposed to a potential fire.

The fire retardant used in the first or core layer is a weak acid. Preferably, it is boric acid or silicic acid or a combination thereof. The fire retardant should be present in the first layer in an amount no less than 2%. Preferably, it is present in an amount no less than 4%. Up to a level of 4%, it has been found that the fire retardancy of the final product is not significantly improved. Above a level of 4%, the fire retardancy of the final product is improved with the concurrent benefit of improved physical properties of the board. This includes properties such as the internal bond strength, resistance to water swell and a reduction in the formaldehyde emission if a formaldehyde containing resin is used. Further properties such as durability tested to the V313 method and dimensional stability are also enhanced. The applicant has found that the reduced level of fire retardant in the core is still effective in inhibiting the formation of volatiles which would ignite on reaching the surface. In addition, in the range up to 8%, the presence of these weak acids enhances and improves the physical characteristics of the resulting board over similar product with a uniformly distributed high level of fire retardant throughout the board. Most preferably, the weak acid fire retardant is present in the first layer in an amount between 4 to 6%.

In the second (or surface) layer, it is preferred that the fire retardant be present in an increased proportion. Below 8%, the retardant will not sufficiently prevent the spreading of a flame and should be present in a higher amount to provide the required fire resistance. Preferably, it is present in an amount greater than 10%. However, as part of a composite boards utility, it is preferred that it not simply resist the spread of a flame but also, when burning, emit a low level of smoke. If the content of flame retardant in the surface layer is above 12%, the applicant has found that the board will emit a higher, and in some circumstances, unacceptable level of smoke when burning. Therefore, most preferably the fire retardant is present in the second (or surface) layer in a range between 10–12%.

In a preferred form of the invention, the composite board comprises a third layer being a further surface layer applied to the reverse side of the board so that the first or core layer is sandwiched between two separate surface layers. In such case, it is preferred that the core layer comprise between about 50 to 70% of the weight of the board with the two surface layers each equally comprising the remainder of the weight of the board. In such a case, both surface layers can have similar levels of fire retardant.

The boards of this invention are particularly suitable for use as substrates for decorative boards and may be laminated with decorative foils or resin impregnated papers.

When making a fire retardant board of the type described above, it is preferred to use a higher resin content in the second and where applicable, third layer, where there is an increased level of fire retardant used. Preferably, the resin content in the first layer is between 8 to 10% (dry resin to dry wood). In the second and third layers (i.e. the surface layers), the resin content is preferably about 10–15% more than the resin content of the first or core layer. Thus, in a board having a resin content of 9% in the core, the surface layers preferably have a resin content of about 10 to 11%. Suitable resins include any of the acid setting resins or systems such as urea formaldehyde, melamine formaldehyde, melamine/urea/formaldehyde and melamine urea phenol formaldehyde resins.

The cellulose material may be in the form of wood chips, flakes, fibres or particles. When making particle board, it is preferred that fine particles be used in the second and third (i.e. surface) layers and coarse particles be used in the core layer. After the cellulose material has been blended with the fire retardant and the resin, it is preferred that the moisture content of the cellulose material be between 7 to 9% in the core layer mix and between 14 to 17% in the surface layers (these percentages are based on the weight of moisture to the dry weight of all other materials in the mix).

It is desirable that within each respective layer that the fire retardant used be distributed substantially uniformly through the cellulose/resin mix. This may be achieved by addition of the fire retardant in a powdered form to the cellulose material prior to the incorporation of the resin. The fire retardant is usually added directly to the surface of the cellulose material in the required proportion. Conventional apparatus may be used such as a cylindrical resin blender having various apertures along its length for the introduction of the various materials sequentially. The powdered acid is preferably first homogenously mixed with the cellulose material. Thereafter, in accordance with conventional processes, it is preferred to add a liquid wax emulsion followed by the required acid setting resin in an aqueous dispersion with some water. The mixture is homogenously blended and formed into a mattress. This mattress is then cut into lengths, loaded into a press and formed into a board of the required density.

The invention is hereafter described by reference to a number of examples which exemplify preferred embodiments of the invention and detail comparative performance with standard composite boards.

BRIEF DESCRIPTION OF THE DRAWINGS

FIG. 4 is a graph of MUF resin gel time (secs) vs. percent boric acid on resin for boards made according to the

DETAILED DESCRIPTION

EXAMPLE 1

Various particle boards were formed utilizing pinus radiata cellulose material and a melamine urea formaldehyde resin. Different boards were made in all respects the same except for differing percentages of added boric acid in the core layer. The boards were all made in accordance with standard particle board manufacturing techniques as described for example in the Concise Encyclopedia of Wood & Wood Based Materials—Permagen Press, Oxford 1989. Broadly, this process involved taking green timber flakes and drying them to a moisture content of between about 1 to 3%. The dried flakes were then screened to separate the larger flakes (for use in making the core of the board) and the finer flakes (for use in making the surface layers). The two fractions were then blended separately with the desired quantity of resin, wax and water and in the case of the fraction intended to be used to form the core, $NH_4Cl$. The resin content in each case for the surface layer material was 9.5% by weight (dry resin to dry flake) and 9.0% by weight for the core (again dry resin to dry flake). 1.0% wax by weight (dry wax to dry flake) was added to both core and surface layer blends. In the core blend only, 1.5% $NH_4Cl$ by weight ($NH_4Cl$ to dry resin) was added. Water was added to adjust the moisture content of the blend intended for the core to between 7–9% and the moisture content of the blend intended for the surface layers to between 14–17% (these percentages were based on the weight of moisture to the dry weight of all other materials in the mix). The blended materials were then transferred to mat forming equipment in which the blends were sequentially spread to form the composite. The materials were spread in respective quantities such that 65% of the weight of the board comprised core material and 35% surface material. The material was pre-pressed, cut to the desired size and transferred to a press at which it was compressed at between 170°–175° C. for about 260 seconds. In each case, the required percentage of boric acid was added only to the blend used to make the core of the board. The acid was added following the screening process and prior to the blending operation. The resulting boards were then tested and their physical characteristics (i.e. internal bond strength, boil swell and thickness swell) compared. The effect of differing amounts of boric acid was also tested with respect to resin gel times. Details of these tests and the performance of the respective boards are shown in the graphed results shown in FIGS. 1 to 4.

Figure 1:
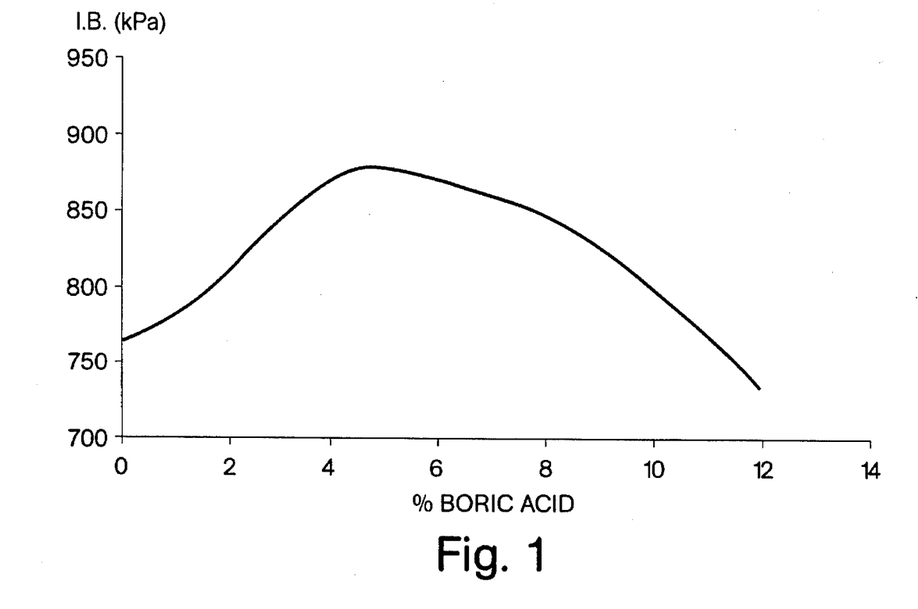
FIG. 1 is a graph of internal bond strength (kPa) vs. percent boric acid for boards made according to the present invention.
Figure 2:
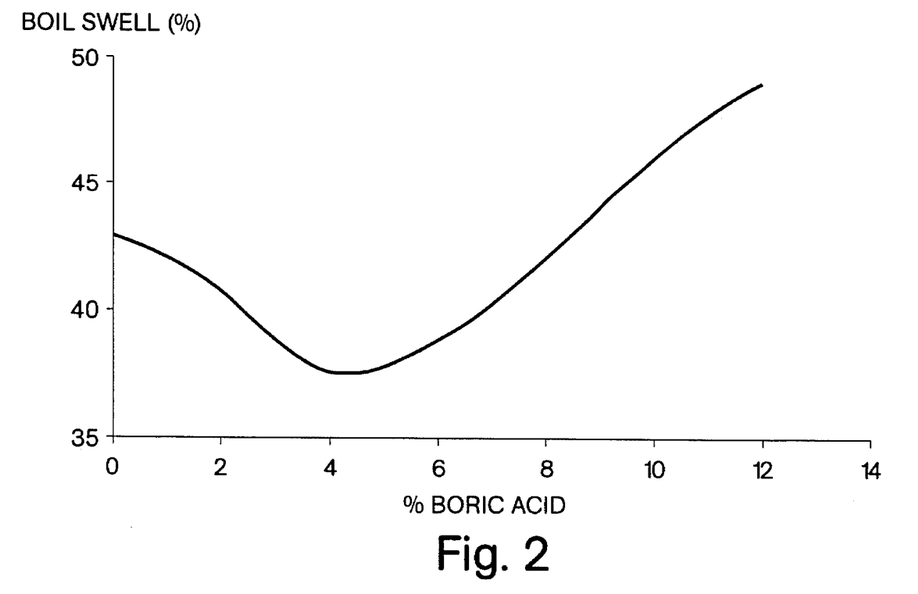
FIG. 2 is a graph of boil swell (percent) vs. percent boric acid for boards made according to the present invention.
Figure 3:
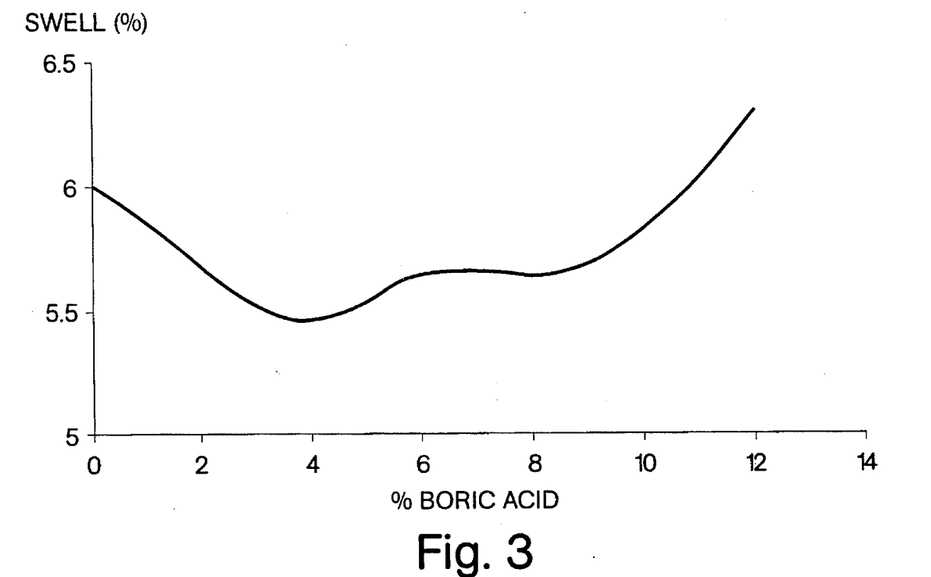
FIG. 3 is a graph of thickness swell (percent) vs. percent boric acid for boards made according to the present invention.
Figure 4:
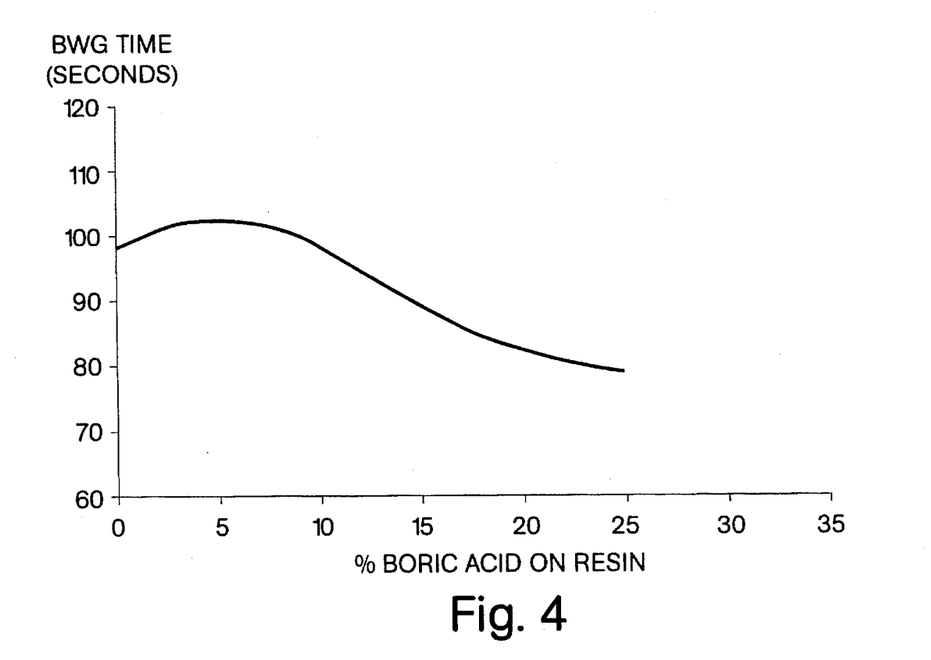

It thus appears that the presence of boric acid in the core region of these boards has had two effects. First, it quickened resin cure, as demonstrated by FIG. 4 which shows a decrease in gel time against the amount of boric acid. In practice in the levels called for in boards of the present invention, this allows a reduction in the manufacturing press cycle time approaching 10%. About 20 seconds is saved in a standard 260 second particle board press cycle. Secondly, as the boric acid remains in the board due to its low steam volatility, it continues to cure the resin after the pressing operation and when present in the levels called for in boards of the present invention this leads to enhanced physical properties as shown in FIGS. 1 to 3.

EXAMPLE 2

A particle board was formed utilizing pinus radiate cellulose material and a melamine urea formaldehyde resin. For the first or core layer, coarse particles having an average size of about 3.0 mm were formed and boric acid in the amount of 4% to the dry weight of the wood particles was added. The boric acid was added in powder form directly onto the wood particles and the components were homogenously mixed. Fine particles were selected for the formation of two surface layers. The average size of these wood particles was about 0.6 mm. To these fine particles, boric acid was again added in an amount of 12% (again, the percentage is based on the dry weight of the particles).

To the coarse particle mixture there was added a liquid wax emulsion (0–8% by weight to dry weight of particles) and an aqueous $NH_4Cl$ solution (2.0% by weight to dry resin). The liquid wax emulsion (in the same proportion) was also added to the fine particle mixture. However, no $NH_4Cl$ was added to this component.

Melamine urea formaldehyde resin in an amount of 9% by weight of dry resin to dry wood particles, was then added to the coarse particle mixture. The same resin was used in the fine particle mixture but in an amount of 10.5% by weight. A particle board was thereafter formed in accordance with standard procedures to produce a board having a core layer constituting about 60% of the weight of the board, made from the coarse particle mixture with the two surface layers (each being about 20% of the weight of the board) being formed from the fine particle mixture.

The board was formed so to have a final density of 710 $kg/m^3$ and a thickness of 18 mm.

For comparative purposes, an identical board was formed using the same methodology but which did not include any boric acid in either the core layer or the surface layers.

The physical properties of both boards were measured yielding the results detailed in Table 1:

TABLE 1

| Property | Units | Reference Board (no boric acid) | Trial Board (including boric acid) |
|---|---|---|---|
| Internal Bond | kPa | 603 | 666 |
| Thickness Swell | % | 8.0 | 5.7 |
| Boil Swell | % | 26.3 | 19.6 |
| Formaldehyde Emission | mg/100 gm | 10.8 | 6.3 |

EXAMPLE 3

A particle board was produced in accordance with the same methodology described in example 2 departing only in the percentage of boric acid used in the first or core layer. In this example, the level of boric acid in the core layer was increased to 6%. Again, a comparative board was produced without utilizing boric acid in either the core or surface layers. Both boards were tested and the physical properties measured as detailed in Table 2:

TABLE 2

| Property | Units | Reference Board (no boric acid) | Trial Board (including boric acid) |
|---|---|---|---|
| Internal Bond | kPa | 638 | 749 |
| Thickness Swell | % | 7.4 | 4.2 |
| Boil Swell | % | 28.8 | 22.6 |
| Formaldehyde Emission | mg/100 gm | 8.9 | 6.3 |
| V313 Swell | % | 12.6 | 5.1 |
| V313 (I.B.) | kPa | 233 | 327 |
| Dimensional Stability (30%–90% rh) | | | |
| thickness | % | 3.53 | 1.82 |
| length | % | 0.25 | 0.16 |

EXAMPLE 4

In this trial, the board thickness was increased to 33 mm. The core layer again constituted about 60% of the thickness of the board with the two surface layers each constituting about 20% of the thickness of the board. In all other respects, the board was made in accordance with the methodology described in Example 3. A reference board was manufactured in an identical way but without including boric acid in the core layer or either of the surface layers. The properties of the boards so produced were as detailed in Table 3:

TABLE 3

| Property | Units | Reference Board (no boric acid) | Trial Board (including boric acid) |
| --- | --- | --- | --- |
| Internal Bond | kPa | 644 | 661 |
| Thickness Swell | % | 4.3 | 3.3 |
| Boil Swell | % | 22.5 | 17.1 |
| Formaldehyde Emission | mg/100 gm | 13.7 | 9.8 |

EXAMPLE 5

The composite board of Example 3 was also tested for a range of other physical characteristics and compared with other boards currently commercially available. These boards were:

1. Duraflake FR manufactured by Willamette Industries, U.S.A. (containing between about 12 to 15% boric acid throughout).
2. Panoflam manufactured by Isoroy, France (containing between about 12 to 15% boric acid throughout).

The test results for all products are detailed in Table 4:

TABLE 4

Comparison of Properties of Boric Acid Fire Retardant Particle Board Products

| Physical Properties | Units | Trial Board | Duraflake FR (USA) | Panoflam (France) |
| --- | --- | --- | --- | --- |
| Density | kg/m³ | 710 | 725 | 675 |
| Modulus of Rupture | MPa | 22.4 | 11.0 | 13.0 |
| Modulus of Elasticity | MPa | 2750 | 2068 | 2500 |
| Internal Bond | kPa | 749 | 551 | 400 |
| Screw Holding | | | | |
| Face | N | 1266 | 1100 | 750 |
| Edge | N | 1071 | 1000 | 550 |
| Thickness Swell (24 h) | % | 4.2 | 9–10 | 12 |
| Water Abs. (24 h) | % | 27 | 42 | 35 |
| Bond Durability | % | 29.9 | 0* | 0* |
|  | MPa | 6.7 | 0* | 0* |
| Boil Swell | % | 22.6 | —* | —* |
| Formaldehyde Emissions | mg/100 g | 6.0 | 17.1 | 9.4 |
| Dimensional Stability (length) | % | 0.16 | 0.05 | 0.32 |

Samples disintegrated on boiling

It can thus be seen that the board of the present invention has enhanced physical properties when compared with conventionally made fire resistant boards.

EXAMPLE 6

Whilst having improved physical performance, the applicant has also found that the fire retardant characteristics of the board of the invention are commensurate with those for boards which have uniformly high percentages of fire retardant throughout. For example, the applicant has tested the fire retardant properties of a board made in accordance with the invention and compared it with other commercial products in which fire retardant is present throughout the board in a uniform amount. The testing was conducted according to AS 1530 Part 3-1989 "Simultaneous Determination of Ignitability, Flame Propogation, Heat Release and Smoke Release". A reference board was also tested containing no fire retardant. Results were as detailed in Table 5:

TABLE 5

| | Reference Board[1] | Trial Board[2] | Duraflake[3] (USA) | Panoflam[4] (France) |
| --- | --- | --- | --- | --- |
| Ignitability (0–20) | 14 | 12 | 0 | 0 |
| Spread of Flame (0–10) | 8 | 0 | 0 | 0 |
| Heat Evolved (0–10) | 6 | 1 | 0 | 0 |
| Smoke Developed (0–10) | 3 | 5 | 7 | 7 |

Notes:
[1] 0% Flame Retardant
[2] Composition of board as in Example 3
[3] 12–15% boric acid throughout (15.9 mm thick)
[4] 12–15% boric acid throughout (12 mm thick)

It will be noted that the trial board of the invention demonstrated comparable fire retarding performance in the "Spread of Flame" test and improved performance in the "Smoke Developed" test when compared to the available commercial products. Whilst the board of the invention did not perform as well as the other commercial boards in the "Ignitability" test, it is the areas of flame spread and smoke development which are of most importance in achieving compliance with government regulation.

EXAMPLE 7

Particle boards were produced using the same methodology as described in Example 2. However, instead of producing an 18 mm board in this example, the boards formed were 12 mm thick. The applicant tested two different boards, the first having 12% boric acid in the surface layers (as in Example 2) and the second having 10%. The boards were tested for a range of fire retardancy characteristics. The results are as detailed in Table 6:

TABLE 6

| Thickness | % Boric Acid in Surface Layers | Smoke Index | Ignitability | Spread of Flame | Heat Evolved |
| --- | --- | --- | --- | --- | --- |
| 12 mm | 12.0 | 6 | 9 | 0 | 1 |
|  | 10.0 | 5 | 12 | 0 | 1 |

EXAMPLE 8

The invention as applied to fibre board is detailed in this example and a comparison is made between the physical properties of a medium density fibre board, made in accordance with the invention incorporating 7.5% boric acid throughout the board and that of a medium density fibre board made under the same conditions but without incorporating any boric acid.

The fibre board was manufactured by first heating pinewood chips in a digester at 170° to 180° C. (steam pressure 8 to 9 bar) to soften the wood. The plasticized wood was then ground into wood fibres by a mechanical process through a refiner. A wood fibre/water slurry was generated through the outlet of the refiner to which was added a melamine urea formaldehyde resin at a loading of 10.2% (oven dried resin to oven dried wood fibre). The wood fibre was blown along a tube drier to reduce the moisture content to between 7 to 14%. The resinated moist fibre was layered into a mattress, pre-pressed to consolidate and then hot pressed at 190° C. for 5 minutes. The panel was thicknessed through sanding heads and trimmed to size. Boric acid was added continuously to the wood chips in the digester. Boric acid was added at a loading of 7.5% by weight (percentage boric acid to oven dried fibre).

The same process was used to produce a reference board to which no boric acid was added.

The results indicated enhanced physical properties for the board made in accordance with the invention. Details of the results of the test are as follows:

| Property | Unit | Trial Board (no boric acid) | Reference Board (7.5% boric acid) |
| --- | --- | --- | --- |
| Internal bond | kPa | 852 | 894 |
| Boil swell | % | 39.2 | 33.7 |
| Formaldehyde emission | mg/100 g | 24 | 15.2 |

As can be seen the board made in accordance with the invention had significantly improved physical characteristics. Furthermore, the trial board showed improvement in machineability (routing and sanding) and paintability.

Thus, the present invention enables the production of a range of composite boards having enhanced physical characteristics and in one embodiment, a board which has good fire retardant properties which are achieved without sacrificing physical strength.

Finally, it should be understood that various additions and/or alterations may be made to the composition of the board, including the nature of the resin, the type of the cellulose material, the density of the final product and the type of fire retardant used without departing from the spirit or ambit of the present invention as defined in the following claims.

We claim:

1. A composite board including a core, the core comprising:
   a first cellulose material having a first dry weight;
   a first cured resin formed of an acid setting resin, the first cured resin binding the first cellulose material together; and
   a first weak acid having a weight and a steam volatility, the weight of the first weak acid being between 2% and 8% of the first dry weight, the steam volatility of the first weak acid being such that a solution containing 10 grams of the first weak acid per kilogram of water has a concentration of the first weak acid in steam of at most 40.0 mg per kilogram of steam at a pressure of 1.0 atmosphere.

2. A composite board as claimed in claim 1, wherein the steam volatility of the first weak acid is such that a solution containing 10 grams of the first weak acid per kilogram of water has a concentration of the first weak acid in steam of at most 20.0 mg per kilogram of steam at a pressure of 1.0 atmosphere.

3. A composite board as claimed in claim 1, wherein the first weak acid has a water solubility in a range from 0.5 g/100 g $H_2O$ to 6.0 g/100 g $H_2O$ at 20° C.

4. A composite board as claimed in claim 1, wherein the first weak acid has a pKa in a range from 7.0 to 12.0.

5. A composite board as claimed in claim 1, wherein the first weak acid is selected from the group consisting of boric acid, silicic acid, antimonic acid and mixtures thereof.

6. A composite board as claimed in claim 5, wherein the first weak acid is granulated boric acid.

7. A composite board as claimed in either claim 1 or claim 5, wherein the weight of the first weak acid is from 4% to 6% of the dry weight.

8. A composite board as claimed in either claim 1 or claim 5, wherein the acid setting resin is selected from the group consisting of urea formaldehyde, melamine formaldehyde, melamine/urea/formaldehyde, melamine urea phenol formaldehyde and mixtures thereof.

9. A composite board as claimed in either claim 1 or claim 5, wherein the first cured resin has a weight in a range between 4% and 25% of the first dry weight.

10. A composite board as claimed in either claim 1 or claim 5, wherein the first cured resin has a weight in a range between 7% and 12% of the first dry weight.

11. A composite board as claimed in claim 10, wherein the weight of the first cured resin is in a range between 8% to 10% of the first dry weight.

12. A composite board as claimed in either claim 1 or claim 5, further comprising:
    inner and outer layers, the core being centrally located between the inner and outer layers, the inner and outer layers each having:
    a second cellulose material; and
    a second cured resin binding the second cellulose material together, wherein a weight of the core is between 50% and 70% of a weight of the board.

13. A composite board as claimed in claim 12, wherein the second cellulose material has a second dry weight, and the inner and outer layers are uniformly integrated and each have:
    a second weak acid having a second weight between 2% and 8% of the second dry weight.

14. A composite board as claimed in claim 12, wherein one or more of: the first cellulose material and the second cellulose material comprise a same cellulose material; the first cured resin and the second cured resin comprise a same cured resin; and the first weak acid and the second weak acid comprise a same weak acid.

15. A composite board as claimed in claim 12, wherein one or more of: the first cellulose material and the second cellulose material comprise a different cellulose material; the first cured resin and the second cured resin comprise a different cured resin; and the first weak acid and the second weak acid comprise a different weak acid.

16. A composite board as claimed in claim 1, wherein the first cellulose material is selected from the group consisting of wood chips, wood flakes, wood fibers, wood particles and combinations thereof.

17. A composite board as claimed in claim 16, wherein the board is a medium density fiber board.

18. A composite board as claimed in claim 13, wherein the weight of the first weak acid is between 6% and 8% of the first dry weight and the weight of the second weak acid is between 6% and 8% of the second dry weight.

19. A composite board as claimed in claim 1, wherein the board is a particle board and the weight of the first weak acid is between 4% and 6% of the first dry weight.

20. A composite board, including a core and adjacent layer, the core comprising:
- a first cellulose material having a first dry weight;
- a first cured resin formed of an acid setting resin, the first cured resin binding the first cellulose material together; and
- a first fire retardant formed of a weak acid having a weight between about 2% to 8% of the first dry weight, the first weak acid having a steam volatility such that a solution of 10 grams of the first weak acid per kilogram of water has a concentration of the first weak acid in steam of at most 40.0 mg per kilogram of steam at a pressure of 1.0 atmosphere; and the adjacent layer, comprising:
- a second cellulose material having a second dry weight;
- a second cured resin binding the second cellulose material together; and
- a second fire retardant having a weight between 8% and 15% of the second dry weight.

21. A composite as claimed in claim 20, wherein the steam volatility of the first weak acid is such that a solution containing 10 grams of the first weak acid per kilogram of water has a concentration of the first weak acid in steam of at most 20.0 mg per kilogram of steam at a pressure of 1.0 atmosphere.

22. A composite as claimed in claim 20, wherein the first weak acid is a low water soluble acid.

23. A composite as claimed in claim 22, wherein a water solubility of the first weak acid is in a range from 0.5 g/100 g $H_2O$ to 6.0 g/100 g $H_2O$ at 20° C.

24. A composite as claimed in claim 20, wherein the first weak acid has a pKa in a range from 7.0 to 12.0.

25. A composite as claimed in claim 20, wherein the first weak acid is selected from the group consisting of boric acid, silicic acid, antimonic acid and mixtures thereof.

26. A composite as claimed in claim 25, wherein the first weak acid consists of boric acid.

27. A composite as claimed in either claim 20 or claim 25, wherein the first weak acid and the second fire retardant comprise a same material.

28. A composite as claimed in either claim 20 or claim 25, wherein the weight of the first weak acid is between 4% and 8% of the first dry weight.

29. A composite as claimed in claim 28, wherein the weight of the weak acid is between 4% and 6% of the first dry weight.

30. A composite as claimed in either claim 20 or claim 25, wherein the second fire retardant comprises between 10% and 15% of the adjacent layer by weight.

31. A composite board as claimed in claim 30, wherein the weight of the second fire retardant is between 10% and 12% of the second dry weight.

32. A composite as claimed in either claim 20 or claim 25, further comprising another layer including a third fire retardant present in an amount substantially the same as an amount of the second fire retardant.

33. A composite as claimed in claim 32, wherein the adjacent layer comprises between 50% to 70% of the board by weight.

34. A composite as claimed in either claim 20 or claim 25, wherein the core has a first resin content, the adjacent layer has a second resin content and the another layer has a third resin content, the first resin content being less than the second resin content, the first resin content being less than the third resin content.

35. A composite as claimed in claim 34, a weight of the first cured resin is between 8% and 10% of the first dry weight and a weight of the second cured resin is between 10% and 15% of the second dry weight.

36. A composite as claimed in either claim 20 or claim 25, wherein first and second cured resins are selected from the group consisting of urea formaldehyde, melamine formaldehyde, melamine/urea/formaldehyde, melamine urea phenol formaldehyde and combinations thereof.

37. A composite board including a core having:
- a cellulose material having a dry weight;
- a cured resin formed of an acid setting resin, the cured resin binding the first cellulose material together; and
- a weak acid selected from the group consisting of boric acid, silicic acid, antimonic acid and combinations thereof, a weight of the weak acid being between 2% and 8% of the dry weight of the cellulose material.

38. A composite board as claimed in claim 37, wherein the weak acid is granulated boric acid.

* * * * *

UNITED STATES PATENT AND TRADEMARK OFFICE
CERTIFICATE OF CORRECTION

PATENT NO. : 5,569,542
DATED : October 29, 1996
INVENTOR(S) : Burton, et al

It is certified that error appears in the above-indentified patent and that said Letters Patent is hereby corrected as shown below:

Column 6, line 61, after "the" insert -- present invention. --

Signed and Sealed this

First Day of April, 1997

BRUCE LEHMAN

Attest:

Attesting Officer

Commissioner of Patents and Trademarks